United States Patent [19]

Minakawa et al.

[11] Patent Number: 5,403,429

[45] Date of Patent: Apr. 4, 1995

[54] APPARATUS FOR JOINING THE ENDS OF BELT-SHAPED MEMBERS

[75] Inventors: Masataka Minakawa; Toshio Azuma, both of Tokyo, Japan

[73] Assignee: Bridgestone Corporation, Tokyo, Japan

[21] Appl. No.: 168,147

[22] Filed: Dec. 17, 1993

[30] Foreign Application Priority Data

Dec. 29, 1992 [JP] Japan .................. 4-359759

[51] Int. Cl.⁶ .......................... B31F 5/00
[52] U.S. Cl. ..................... 156/502; 156/304.1; 156/507; 156/556; 198/621; 198/750
[58] Field of Search ........... 156/502, 507, 556, 304.1; 198/604, 605, 621, 750

[56] References Cited

U.S. PATENT DOCUMENTS

| | | | |
|---|---|---|---|
| 3,075,571 | 1/1963 | Wise | 156/502 |
| 4,181,558 | 1/1980 | Neubronner | 156/506 X |
| 4,268,330 | 5/1981 | Komatsu et al. | 156/502 X |
| 4,421,591 | 12/1983 | DeLigt | 156/507 X |
| 4,765,862 | 8/1988 | Azuma | 156/507 |

FOREIGN PATENT DOCUMENTS 55-14739 4/1980 Japan .

Primary Examiner—David A. Simmons
Assistant Examiner—Paul M. Rivard
Attorney, Agent, or Firm—Sughrue, Mion, Zinn, Macpeak & Seas

[57] ABSTRACT

An apparatus for joining the ends of belt-shaped members. The apparatus includes first and second transporting devices, a positioning device, and an end affixing device. The first and second transporting devices extend and retract in the longitudinal direction of the belt-shaped member, and transport the belt-shaped members in the longitudinal direction thereof. The positioning device stops the transport of the belt-shaped members and positions the belt-shaped members as opposing ends of the belt-shaped members on the first and second transporting devices being driven abut against the positioning device. The end affixing device joins the aligned ends of the belt-shaped members. Accordingly, the apparatus for joining the ends of belt-shaped members properly positions and joins the opposing ends of the belt-shaped members on the first and second transporting devices.

11 Claims, 3 Drawing Sheets

APPARATUS FOR JOINING THE ENDS OF BELT-SHAPED MEMBERS

BACKGROUND OF THE INVENTION

1. Field of the Invention

The present invention relates to an apparatus for joining the ends of belt-shaped members, such as rubberized cord layers constituting a pneumatic tire.

2. Description of the Related Art

As a conventional apparatus for joining the ends of belt-shaped members, one disclosed in, for instance, U.S. Pat. No. 4,765,862 is known. The apparatus in the justmentioned invention comprises: a first conveyor extending in the longitudinal direction of the belt-shaped member; a second conveyor disposed in a direction of the first conveyor and extending in the longitudinal direction of the belt-shaped member; a plurality of vertically extending positioning pins disposed between the first and second conveyors in such a manner as to be capable of being raised or lowered, so as to position the belt-shaped members as a front end of the belt-shaped member on the first conveyor and a rear end of the belt-shaped member on the second conveyor abut against each other when the positioning pins are raised so as to project upwardly from the first and second conveyors; upper joining pawls disposed above the positioning pins and capable of being raised or lowered; and lower joining pawls disposed below the upper joining pawls so as to join the front end of the belt-shaped member on the first conveyor and the rear end of the belt-shaped member on the second conveyor in cooperation with the upper joining pawls which have been lowered.

With such a conventional apparatus for joining the ends of belt-shaped members, a leading belt-shaped member must be transported from the first conveyor to the second conveyor prior to the starting of the joining operation. However, since the aforementioned lower joining pawls project slightly above the upper surfaces of the first and second conveyors, there have been cases where the leading belt-shaped member becomes caught by the lower joining pawls midway during transport, and therefore cannot be transported onto the second conveyor. In such a case, the operator is compelled to bring that belt-shaped member to the second conveyor, so that there has been a problem in that the operating efficiency is low, and automation cannot be implemented. In addition, when the belt-shaped members on the first and second conveyors abut against the positioning pins, the first and second conveyors run to transport the belt-shaped members placed thereon in the forward and reverse directions, respectively. At this time, the front and rear ends of these belt-shaped members move toward the positioning pins while coming into sliding contact with guide plates, respectively. Therefore, when the viscosity of the belt-shaped members changes due to a temperature change or the like, the frictional resistance of the belt-shaped members with respect to the guide plates also changes, thereby deteriorating the accuracy with which the front and rear ends of the belt-shaped members are fed. This causes the parallelism of the front and rear ends of the belt-shaped members to decline, causing faulty joining. Additionally, in cases where the longitudinal length of the belt-shaped members is short, a transporting and driving force imparted to the belt-shaped members from the first and second conveyors becomes small. If the viscosity of the belt-shaped members increases on such an occasion, the belt-shaped member may possibly adhere to the guide plate at a midway position. A wide gap is hence produced between the front and rear ends of the belt-shaped members, thereby resulting in faulty joining.

SUMMARY OF THE INVENTION

Accordingly, it is an object of the present invention to provide an apparatus for joining the ends of belt-shaped members which makes it possible to join the front and rear ends of the belt-shaped members with high efficiency and high accuracy, thereby overcoming the above-described drawbacks of the conventional art.

To this end, in accordance with one aspect of the invention, there is provided an apparatus for joining the ends of belt-shaped members, comprising: first transporting means for transporting the belt-shaped members in a longitudinal direction thereof, the first transporting means being capable of being extended or retracted in the longitudinal direction of the belt-shaped member; second transporting means for transporting the belt-shaped members in the longitudinal direction thereof, the second transporting means being located in face-to-face relation with the first transporting means and arranged in alternating relation with respect to the first transporting means along a transverse direction of the belt-shaped member when the second transporting means is brought closest to the first transporting means, the second transporting means being capable of being extended or retracted in the longitudinal direction of the belt-shaped member; positioning means for positioning the belt-shaped members as the ends of the belt-shaped members on the first and second transporting means abut against each other, the positioning means being disposed at a boundary between the first and second transporting means in such a manner as to be capable of being raised or lowered; and end affixing means for joining and affixing the ends of the belt-shaped members on the first and second transporting means, the end affixing means being disposed in a vicinity of positions of the belt-shaped members determined by the positioning means.

In addition, the above object can also be attained by the provision of an apparatus for joining the ends of belt-shaped members, comprising: a plurality of first belts spaced apart from each other in a transverse direction of the belt-shaped member and extending in a longitudinal direction of the belt-shaped member; a first conveyor having the first belts and capable of extending or retracting in the longitudinal direction of the belt-shaped member; a plurality of second belts disposed forwardly of the first conveyor, spaced apart from each other in the transverse direction of the belt-shaped member, and extending in the longitudinal direction of the belt-shaped member, the plurality of second belts being arranged in alternating relation with respect to the first belts; a second conveyor having the second belts and capable of extending or retracting in the longitudinal direction of the belt-shaped member, rear ends of the second belts being interdigitated with front ends of the first belts when the first conveyor is extended and brought closest to the second conveyor; a plurality of vertically extending positioning pins disposed at a boundary between the first conveyor and the second conveyor in such a manner as to be capable of being raised or lowered, to position the belt-shaped members as a front end of the belt-shaped member on the first conveyor and a rear end of the belt-shaped member on the second conveyor abut against each other when the positioning pins are raised to project upwardly from the first and second conveyors; upper joining pawls disposed above the positioning pins and capable of being raised or lowered; and lower joining pawls disposed below the upper joining pawls in such a manner as to be capable of being raised or lowered, to join the front end of the belt-shaped member on the first conveyor and the rear end of the belt-shaped member on the second conveyor in cooperation with the upper joining pawls which have been lowered, when the lower joining pawls are raised.

Prior to starting the joining operation, the leading belt-shaped member must be transported in advance from the first conveyor to the second conveyor. In that case, after the positioning pins and the lower joining pawls are lowered, the first conveyor is extended forwardly, and the second conveyor is extended rearwardly to allow the first and second conveyors to approach each other. Then, when the first and second conveyors are brought closest to each other, and the rear ends of the second belts of the second conveyor are interdigitated with the front ends of the first belts of the first conveyor, the first belts of the first conveyor and the second belts of the second conveyor are made to travel in the same direction to transport the leading belt-shaped member from the first conveyor to the second conveyor. At this time, since the arrangement provided is such that the lower joining pawls are lowered to wait at a position below the first and second conveyors as described above, the leading belt-shaped member is transported reliably and easily onto the second conveyor without being restricted by the lower joining pawls. Hence, operating efficiency is improved, and automation becomes possible.

Next, when joining the belt-shaped members, the positioning pins are first raised to project above the first and second conveyors. Then, the first and second conveyors are operated to forwardly transport the belt-shaped member on the first belts until its front end abuts against the positioning pins and to rearwardly transport the belt-shaped member on the second belts until its rear end abuts against the positioning pins. At this time, since the rear ends of the second belts of the second conveyor are interdigitated with the front ends of the first belts of the first conveyor as described above, even if the viscosity of the belt-shaped members on the first and second conveyors is high, or even if the longitudinal lengths of these belt-shaped members are short, the belt-shaped members can be transported reliably without being affected by such conditions until they abut against the positioning pins. Subsequently, the positioning pins are lowered and retreated below the first and second conveyors. At the same time, the first and second conveyors are retracted, thereby forming a space between the first and second conveyors. Further, the upper and lower joining pawls are lowered and raised, respectively, to join together the front end of the belt-shaped member on the first conveyor and the rear end of the belt-shaped member on the second conveyor in the space by means of these upper and lower joining pawls. At this time, since the two belt-shaped members abut against the positioning pins reliably until immediately before joining as described above, the parallelism of the front and rear ends and the gap accuracy are high, with the result that the joining of these belt-shaped members can be effected satisfactorily. Next, the upper and lower joining pawls are respectively raised and lowered to their initial positions, and the first and second conveyors are extended, allowing the front and rear ends of the first and second belts to interdigitate with each other. Then, the first and second conveyors are made to travel to transport the integrated belt-shaped members, which became elongated by joining, onto the second conveyor. Thereafter, the above cycle of operations is repeated to consecutively join the front and rear ends of the belt-shaped members.

As described above, the apparatus for joining the ends of belt-shaped members in accordance with the present invention makes it possible to join the front and rear ends of the belt-shaped members with high efficiency and high accuracy.

The other objects, features and advantages of the present invention will become more apparent from the following detailed description of the invention. The accompanying drawings, which are incorporated and constitute a part of the specification, illustrate the preferred embodiment of the invention and, together with the description, serve to explain the principles of the invention.

DETAILED DESCRIPTION OF THE PREFERRED EMBODIMENT

Figure 1:
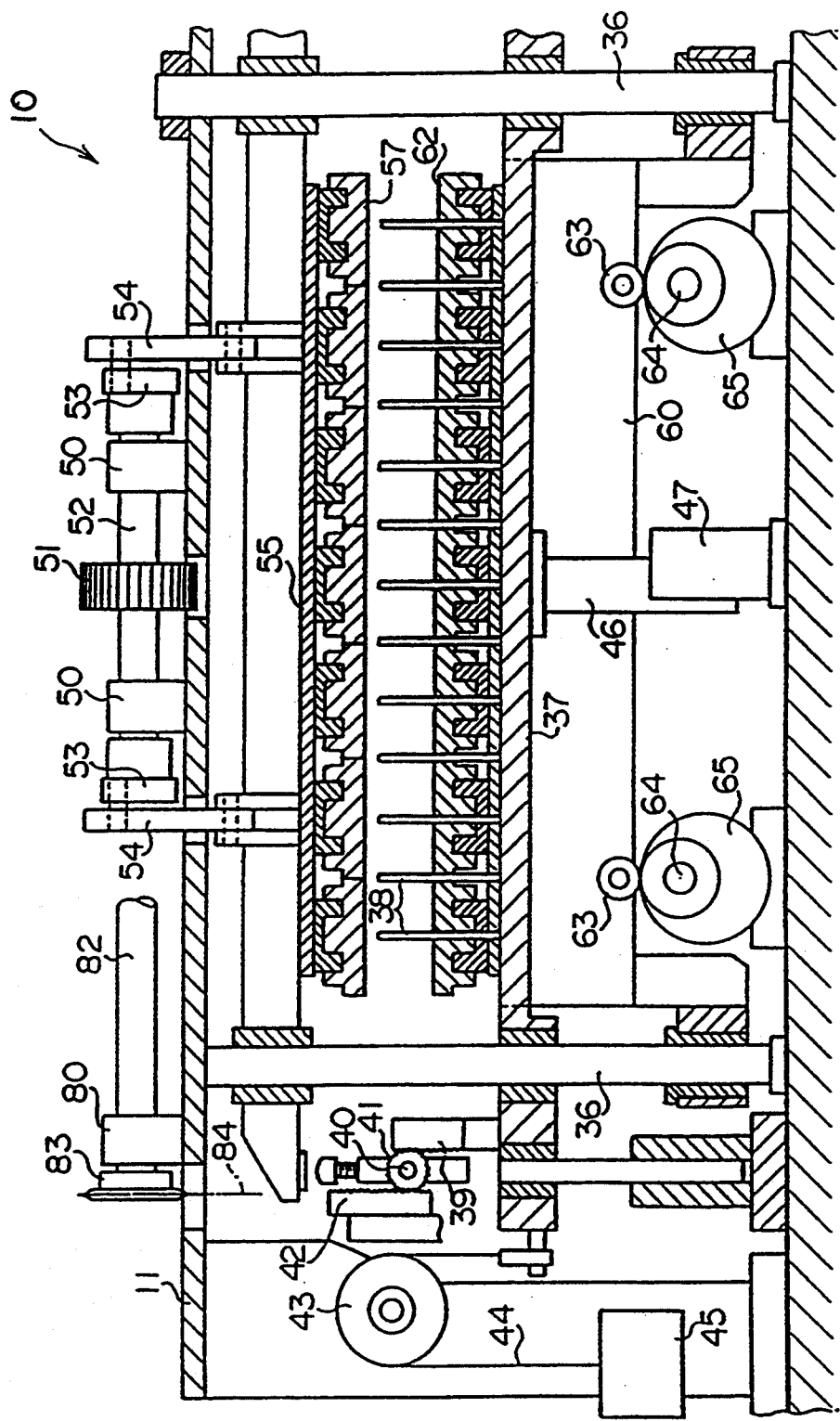
FIG. 1 is a front cross-sectional view illustrating an embodiment of the present invention.
Figure 2:
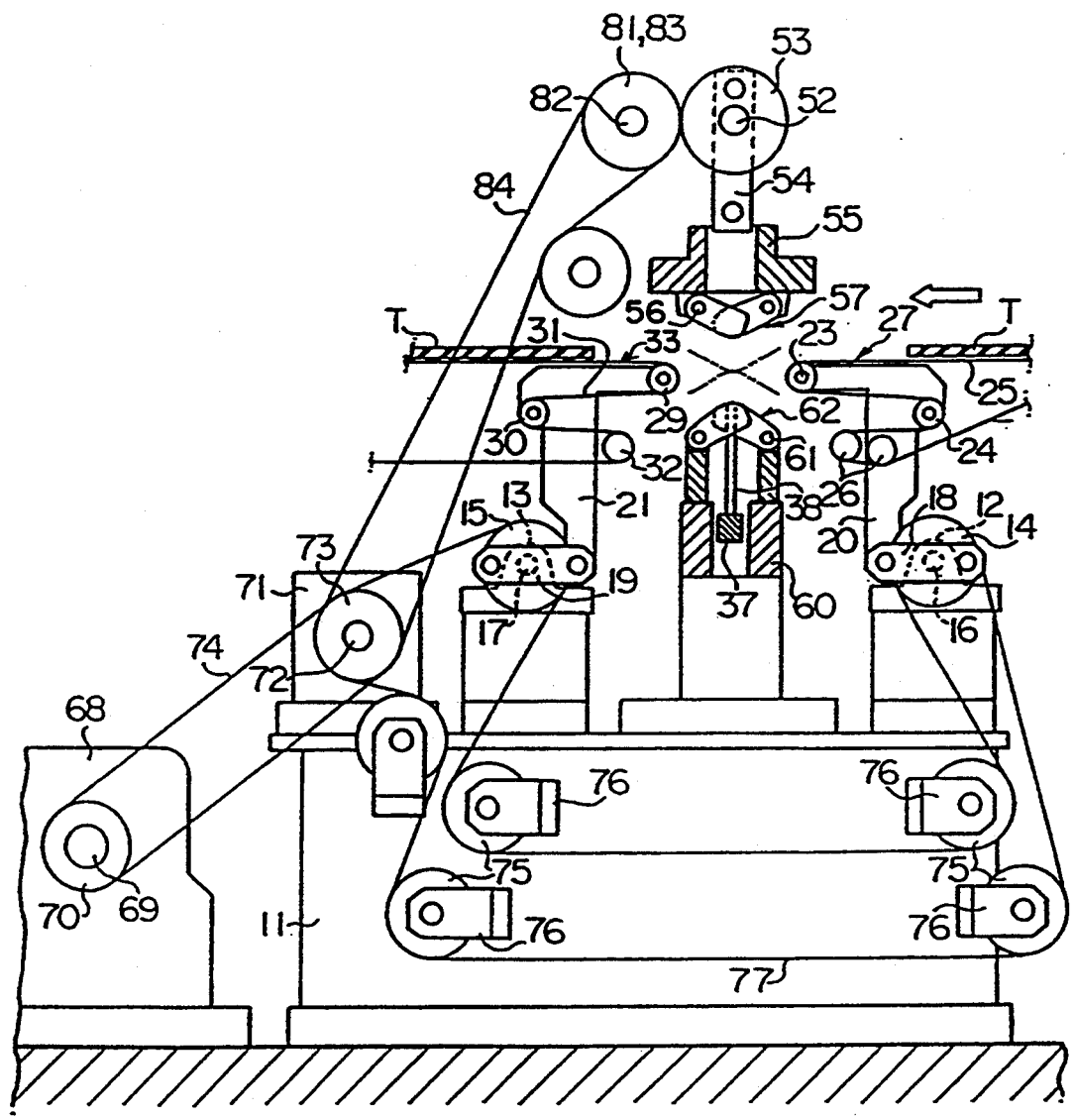
FIG. 2 is a partially cutaway side elevational view of an essential portion.
Figure 3:
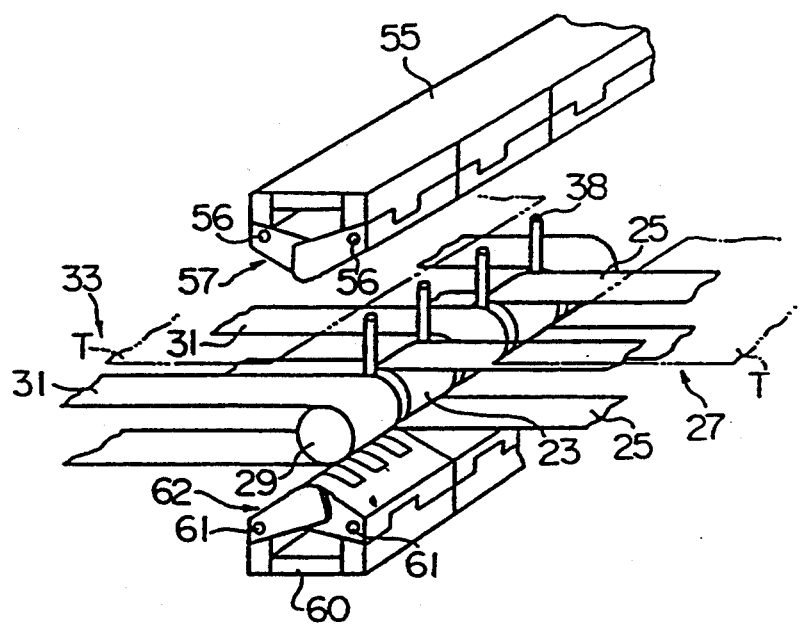
FIG. 3 is a partial perspective view of upper and lower joining pawls.
Figure 4:
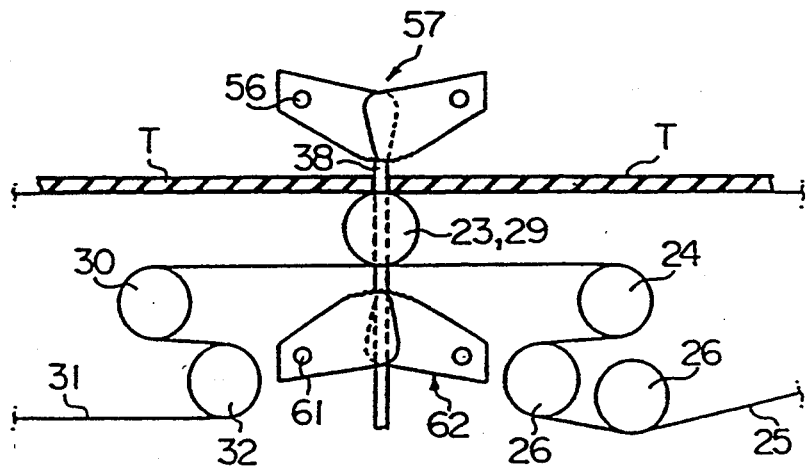
FIG. 4 is a partial side elevational view of the upper and lower joining pawls.

FIGS. 1 to 4 illustrate an apparatus 10 for joining the ends of a belt-shaped member in accordance with an embodiment of the present invention. This apparatus 10 for joining the ends of a belt-shaped member has a fixed frame 11. Bearings 12 and 13 which are spaced apart from each other in the longitudinal direction of a belt-shaped member T (such as a rubberized cord layer for manufacturing a carcass ply) are mounted on this fixed frame 11. Rotating shafts 16 and 17 having sprockets 14 and 15 respectively mounted thereon are rotatably supported by these bearings 12 and 13. The links 18 and 19 are rotatably coupled at one end to radially outward ends of these sprockets 14 and 15, respectively. The other ends of these links 18 and 19 are rotatably coupled to lower ends of moving tables 20 and 21, respectively. As the sprockets 14 and 15 are rotated, these moving tables 20 and 21 move equal distances in opposite directions along the belt-shaped member T while being guided by unillustrated guides. Supported at a front end of the moving table 20 are a plurality of rollers 23 which respectively rotate about straight lines parallel with the transverse direction of the belt-shaped member T. These rollers 23 are arranged in the axial direction of the rollers 23, i.e., in the transverse direction of the belt-shaped member T in such a manner as to be spaced apart from each other at distances each substantially equivalent to the axial length of the roller 23.

A plurality of rollers 24, which are similar to the rollers 23, are similarly supported rotatably at a rear portion of the moving table 20. First belts 25 extending in the longitudinal direction of the belt-shaped member T are trained between these rollers 23 and 24. Since the rollers 23 and 24 are arranged in such a manner as to be spaced apart from each other in the transverse direction of the belt-shaped member T, as described above, these first belts 25 are also arranged in such a manner as to be spaced apart from each other in the transverse direction of the belt-shaped member T. These first belts 25 are also wound around a plurality of idle rollers 26 supported rotatably by the fixed frame 11. The direction of travel of the first belts 25 is changed by these rollers. The aforementioned moving table 20, rollers 23 and 24, first belts 25, and idle rollers 26 as a whole constitute a first conveyor 27. As the moving table 20 moves in the longitudinal direction of the belt-shaped member T, the front end portion of this first conveyor 27 is extended or retracted without causing the first belts 25 to travel.

Meanwhile, a plurality of rollers 29, which are spaced apart from each other in the transverse direction of the belt-shaped member T in the same way as the rollers 23, are rotatably supported at a rear end of the moving table 21. A plurality of rollers 30, which are similar to the rollers 29, are rotatably supported at the front of the moving table 21. A plurality of second belts 31 extending in the longitudinal direction of the belt-shaped member T are trained between the rollers 29 and 30 in such a manner as to be spaced apart from each other in the transverse direction of the belt-shaped member T. These second belts 31 are arranged in alternating relation with respect to the first belts 25 along the transverse direction of the belt-shaped member T. These second belts are also wound around a plurality of idle rollers 32 supported rotatably by the fixed frame 11. The aforementioned moving table 21, rollers 29 and 30, second belts 31, and idle rollers 32 as a whole constitute a second conveyor 33 disposed in front of the first conveyor 27. As the moving table 21 moves in the longitudinal direction of the belt-shaped member T, the rear end portion of this second conveyor 33 is extended or retracted without causing the second belts 31 to travel. When the first conveyor 27 is extended forwardly and the second conveyor 33 is extended rearwardly, and the first conveyor 27 and the second conveyor 33 are thereby brought closest to each other, the rear ends of the second belts 31 are interdigitated with the front ends of the first belts 25 (see FIG. 3).

A plurality of guide rods 36 extending vertically are mounted on the fixed frame 11. A horizontal lifting base 37 is supported by these guide rods 36 in such a manner as to be capable of being raised or lowered. Lower ends of a plurality of positioning pins 38 extending vertically are fixed on an upper surface of this lifting base 37. These positioning pins 38 are arranged in such a manner as to be spaced apart from each other at equal intervals in the transverse direction of the belt-shaped member T at a boundary between the first conveyor 27 and the second conveyor 33. A vertical rack 39 is fixed at a side end of the lifting base 37, and a pinion 41 secured to a liftable rotating shaft 40 meshes with this rack 39.

A vertically extending rack 42 is mounted on the fixed frame 11, and this rack 42 meshes with the pinion 41. As a result, as the pinion 41 is raised while rotating, the rack 39 and the lifting base 37 are lifted at high speed while being guided by the guide rods 36. When the lifting base 37 reaches its upper limit, the upper ends of the positioning pins 38 are capable of projecting upwardly from the upper surfaces of the first conveyor 27 and the second conveyor 33. As a result, when the belt-shaped member T on the first conveyor 27 is transported forwardly, and the belt-shaped member T on the second conveyor 33 is transported rearwardly, the front end and the rear end of these belt-shaped members T abut against the projecting positioning pins 38, and their positions are determined. A sprocket 43 is rotatably supported by the fixed frame 11. A balance weight 45 is attached to one end of a chain 44 wound around this sprocket 43, and the other end of the chain 44 is coupled to a side end of the lifting base 37. As a result, the lifting base 37 is raised and lowered smoothly. A vertically extending stopper plate 46 is fixed to the underside of the lifting base 37. When the lifting base 37 is lowered to its lower limit, the stopper plate 46 is clamped from both sides thereof by a clamp mechanism 47 disposed immediately below the lifting base 37, thereby restricting the movement of the lifting base 37.

A pair of bearings 50 which are spaced apart from each other in the transverse direction of the belt-shaped member T are fixed on the upper surface of the fixed frame 11. A horizontal rotating shaft 52 having an external gear 51 mounted at an axially central portion thereof is rotatably supported by these bearings 50. Disk-shaped cam plates 53 are fixed at axially opposite ends of this rotating shaft 52, and the links 54 are each rotatably coupled at one end to radially outward ends of these cam plates 53. A horizontal movable base 55 extending in the transverse direction of the belt-shaped member T is rotatably coupled to the other ends of these links 54, and this movable base 55 is liftably supported by the guide rods 36. A plurality of pairs of upper joining pawls 57, which are capable of swinging about pins 56 are supported on the underside of the movable base 55. When the rotating shaft 52 and the cam plates 53 rotate, these upper joining pawls 57 are raised together with the movable base 55 while being guided by the guide rods 36.

A movable base 60, which is liftably supported by the guide rods 36, is disposed below the upper joining pawls 57, and this movable base.60 extends horizontally in the transverse direction of the belt-shaped member T. Supported on the upper surface of this movable base 60 are a plurality of pairs of lower joining pawls 62 which are capable of swinging about pins 61. As a result, these lower joining pawls 62 are arranged in such a manner as to be capable of being raised or lowered below the upper joining pawls 57. A plurality of rollers 63 are rotatably supported in a lower portion of the movable base 60. Rotating shafts 64, which respectively rotate about straight lines parallel with the longitudinal direction of the belt-shaped member T, are disposed immediately below these rollers 63. These rotating shafts 64 are respectively provided with eccentric cams 65 whose central axes are offset from the central axes of the rotating shafts 64. The rollers 63 are respectively in rolling contact with the outer peripheries of these eccentric cams 65. As the rotating shafts 64 and the eccentric cams 65 rotate, the movable base 60 and the lower joining pawls 62 are raised while being guided by the guide rods 36. When these lower joining pawls 62 are raised to their upper limit, the lower joining pawls 62 in cooperation with the upper joining pawls 57, which have been lowered to their lower limit, draw close to each other the front end of the belt-shaped member T on the first conveyor 27 and the rear end of the belt-shaped member T on the second conveyor 33, and butt-join them.

A drive motor 68 serving as a driving means is installed in front of the fixed frame 11. A chain 74 is trained between a sprocket 70 secured to an output shaft 69 of this drive motor 68 and a sprocket 73 fixed to a rotating shaft 72 of a gear mechanism 71 secured to the fixed frame 11. In addition, a plurality of sprockets 75 are rotatably supported by the fixed frame 11 by means of brackets 76. A chain 77 is trained around these sprockets 75, 14, 15, and 73. As a result, when the drive motor 68 is operated, the sprockets 14 and 15 are synchronously rotated in opposite directions.

A plurality of bearings 80 are fixed to the upper surface of the fixed frame 11. A rotating shaft 82, on which an external gear 81 meshing with the external gear 51 is fixed, is rotatably supported by these bearings 80. A chain 84 is trained between a sprocket 83 fixed to this rotating shaft 82 and the sprocket 73. As a result, when the drive motor 68 is operated, the rotating shafts 82 and 52 rotate synchronously. In addition, the rotating shaft 72 of the gear mechanism 71 is coupled to the rotating shaft 40 and the rotating shafts 64 via unillustrated transmission shafts and gears. Consequently, when the drive motor 68 is operated, the rotating shafts 40 and 64 are rotated synchronously. Thus, since the extension and retraction of the first and second conveyors 27 and 33, the raising and lowering of the positioning pins 38, and the raising and lowering of the upper joining pawls 57 and lower joining pawls 62 are effected by the driving force of the single drive motor 68, the structure of the driving system is simplified, so that the apparatus can be manufactured at low cost and made compact.

Next, a description will be given of the operation of the apparatus 10 for joining the ends of belt-shaped members.

To join the front and rear ends of the belt-shaped members T, the belt-shaped member T must be present on the second conveyor 33 in advance, so that a leading belt-shaped member T is transported from the first conveyor 27 to the second conveyor 33 prior to the starting of the joining operation. In this case, the drive motor 68 is operated to rotate the rotating shaft 72 of the gear mechanism 71. This rotation is transmitted to the pinion 41 to rotate the pinion 41, so that the lifting base 37 and the positioning pins 38 are lowered smoothly to the lower limits while being assisted by the balance weight 45.

Next, the clamp mechanism 47 is operated to clamp the stopper plate 46 from both sides thereof, thereby forcibly stopping the lifting base 37 and the positioning pins 38 at their lower limits. Also, the rotation of the rotating shaft 72 is transmitted to the rotating shafts 64 to rotate the eccentric cams 65. As a result, the movable base 60 and the lower joining pawls 62 are lowered to their lower limits and stop.

At this time, since the rotation of the rotating shaft 72 is also transmitted to the sprockets 14 and 15 to rotate the sprockets 14 and 15, the moving table 20 and the rollers 23 and 24 move forwardly, while the moving table 21 and the roller 29 and 30 move rearwardly. Consequently, the first conveyor 27 is extended forwardly, and the second conveyor 33 is extended rearwardly. Then, when these first and second conveyors 27 and 33 are extended most and brought closest to each other, the rear ends of the second belts 31 of the second conveyor 33 are interdigitated with the front ends of the first belts 25 of the first conveyor 27, and the rollers 23 and 29 are thereby arranged concentrically. At this time, since the positioning pins 38 and the lower joining pawls 62 are retreated to their lower limits as described above, the extending operation of the first conveyor 27 and the second conveyor 33 is not restricted by the positioning pins 38 and the lower joining pawls 62. When this state is reached, the operation of the drive motor 68 is stopped temporarily.

Next, the first belts 25 of the first conveyor 27 and the second belts 31 of the second conveyor 33 are made to travel in the same direction to transport the leading belt-shaped member T from the first conveyor 27 to the second conveyor 33. At this time, since the arrangement provided is such that the lower joining pawls 62 are lowered and wait at a position lower than the upper surfaces of the first and second conveyors 27 and 33 as described above, the leading belt-shaped member T is transported reliably and easily onto the second conveyor 33 without being restricted by the lower joining pawls 62. Hence, the operating efficiency is improved, and automation becomes possible.

Subsequently, when joining the rear end of the leading belt-shaped member T placed on the second conveyor 33 and the front end of the belt-shaped member T on the first conveyor 27, the stopper plate 46 is first released from the clamp by the clamp mechanism 47, and the drive motor 68 is operated again to rotate the rotating shaft 72 of the gear mechanism 71, thereby rotating the pinion 71 to raise the lifting base 37 and the positioning pins 38 to their upper limits. As a result, the upper ends of the positioning pins 38 project upwardly from the upper surfaces of the first conveyor 27 and the second conveyor 33. Then, both the first conveyor 27 and the second conveyor 33 are operated so as to forwardly transport the belt-shaped member T on the first belts 25 until its front end strongly abuts against the positioning pins 38 and to rearwardly transport the belt-shaped member T on the second belts 31 until its rear end strongly abuts against the positioning pins 38, thereby forming deformed portions in the front and rear ends of these belt-shaped members T. Consequently, the posture of the front and rear ends of these belt-shaped members T is corrected in such a manner that the front end rear ends the belt-shaped members T become substantially parallel with each other, and the distance therebetween is set at a fixed distance. At this time, since the rear ends of the second belts 31 of the second conveyor 33 are interdigitated with the front ends of the first belts 25 of the first conveyor 27 as described above, even if the viscosity of the belt-shaped members T on the first and second conveyors 27 and 33 is high due to a high atmospheric temperature, or even if the longitudinal lengths of these belt-shaped members T are short, the belt-shaped members T can be transported reliably without being affected by such conditions until they abut against the positioning pins 38.

Next, when the drive motor 68 is rotated in the reverse direction to the aforementioned direction, the pinion 41 is rotated, and the positioning pins 38 are lowered to their lower limit. As a result, the positioning pins 38 are retreated below the first and second conveyors 27 and 33. At this time, the moving tables 20 and 21 move rearwardly and forwardly, respectively, with the result that the first and second conveyors 27 and 33 retract, thereby forming a space between the first and second conveyors 27 and 33. At this time, it is only the moving tables 20 and 21 and the rollers 23, 24, 29 and 30 that move when the first and second conveyors 27 and 33 retract, so that the first and second belts 25 and 31 do not travel. Consequently, the positions of the belt-shaped members T on the first and second conveyors 27 and 33 do not change. For instance, both the rollers 23 and 24 are fixed on the moving table 20 and move if the moving table 20 moves. However, since the distance between the rollers 23 and 24 is constant, the first belts 25 do not travel.

Meanwhile, since the rotating shafts 52 and 64 are rotated by the reverse rotation of the drive motor 68, the movable base 55 is pushed downward by the links 54, and the movable base 60 is pushed upward by the eccentric cams 65. As a result, the upper and lower joining pawls 57 and 62 swing about the pins 56 and 61 while clamping the front end of the belt-shaped member T on the first conveyor 27 and the rear end of the belt-shaped member T on the second conveyor 33 from above and below in the space, to draw the front end rear ends of the belt-shaped members T close to each other and butt-join them. At this time, since the two belt-shaped members T reliably abut against the positioning pins 38 until immediately before joining as described above, the parallelism of the front and rear ends and the gap accuracy are high, with the result that the joining of these belt-shaped members T can be effected satisfactorily.

Next, by operating the drive motor 68, the upper and lower joining pawls 57 and 62 are respectively raised and lowered to their initial positions, and the first and second conveyors are extended, allowing the front and rear ends of the first and second belts 25 and 31 to interdigitate with each other. Then, the first and second conveyors 27 and 33 are made to travel to transport the integrated belt-shaped members T, which became elongated by joining, onto the second conveyor. Thereafter, the above cycle of operations is repeated to consecutively join the front and rear ends of the belt-shaped members T, and carcass plies, for example, are fabricated.

It should be noted that although in this embodiment the belt-shaped members T whose front and rear ends are perpendicular to the longitudinal direction are joined, the present invention is also applicable to cases where the belt-shaped members whose front and rear ends are inclined at a predetermined angle with respect to the longitudinal direction are joined.

What is claimed is:

1. An apparatus for joining ends of belt-shaped members, comprising:
   first transporting means for transporting the belt-shaped members in a longitudinal direction thereof, said first transporting means being disposed for extension and retraction in the longitudinal direction of the belt-shaped members;
   second transporting means for transporting the belt-shaped members in the longitudinal direction thereof, said second transporting means being located in face-to-face relation with said first transporting means and arranged in alternating relation with respect to said first transporting means along a transverse direction of the belt-shaped members when said second transporting means is brought closest to said first transporting means, said second transporting means being disposed for extension and retraction in the longitudinal direction of the belt-shaped members;
   positioning means for fixing a position of the belt-shaped members relative to each other when the ends of the belt-shaped members on said first and second transporting means abut against each other, said positioning means being disposed at a boundary between said first and second transporting means in such a manner as to be capable of being raised and lowered when said first and second transporting means are fully extended; and
   end affixing means for joining and affixing the ends of the belt-shaped members after said first and second transporting means are retracted, wherein the belt-shaped members remain in the position fixed by said positioning means when said first and second transporting means are retracted, wherein said end affixing means is disposed in a vicinity of the ends of the belt-shaped members fixed in position by said positioning means, and wherein said end affixing means is disposed in such a manner as to be capable of being raised and lowered.

2. An apparatus for joining the ends of belt-shaped members according to claim 1, wherein each of said first and second transporting means comprises a moving table movable along the longitudinal direction of the belt-shaped members while being guided by a guide, and means for separately conveying the belt-shaped members along said moving table.

3. An apparatus for joining the ends of belt-shaped members according to claim 1, wherein each of said first and second transporting means comprises:
   a moving table disposed movably along the longitudinal direction of the belt-shaped members while being guided by a guide;
   a plurality of rollers supported at both ends of said moving table, each of said plurality of rollers rotating about a straight line parallel with the transverse direction of the belt-shaped members;
   a plurality of idle rollers supported rotatably by a fixed frame; and
   a plurality of first belts trained around said idle rollers and spaced apart from each other in the transverse direction of the belt-shaped members.

4. An apparatus for joining the ends of belt-shaped members according to claim 1, further comprising:
   lifting means including vertically extending guide rods mounted on a fixed frame;
   a lifting base supported liftably and horizontally by said guide rods;
   a first vertical rack secured to a side wall of said liftable base;
   a second vertical rack fixedly secured to the fixed frame; and
   a pinion meshing with said first and second racks, said positioning means being secured to said lifting means,
   wherein as said pinion is raised while rotating, said first rack and said lifting base are raised at high speed while being guided by said guide rack, and wherein when said lifting base reaches its upper limit, said positioning means projects upwardly between said fully extended first and second transporting means to fix the position of the belt-shaped members supported by said first and second transporting means.

5. An apparatus for joining the ends of belt-shaped members according to claim 1, wherein a single driving means is coupled to said first and second transporting means, said positioning means, and said end affixing means, and wherein the extension and retraction of said first and second transporting means, the raising and lowering of said positioning means, and the raising and lowering of said end affixing means are effected by a driving force from said driving means.

6. An apparatus for joining the ends of belt-shaped members, comprising:

a plurality of first belts spaced apart from each other in a transverse direction of the belt-shaped members and extending in a longitudinal direction of the belt-shaped members;

a first conveyor on which said first belts are rotatably mounted, said first conveyor being disposed for extension and retraction in the longitudinal direction of the belt-shaped members while the belt-shaped members remain stationary;

a plurality of second belts disposed forwardly of said first conveyor, spaced apart from each other in the transverse direction of the belt-shaped members, and extending in the longitudinal direction of the belt-shaped members, said plurality of second belts being arranged in alternating relation with respect to said first belts;

a second conveyor on which said second belts are rotatably mounted, said second conveyor being disposed for extension and retraction in the longitudinal direction of the belt-shaped members while the belt-shaped members remain stationary, rear ends of said second belts being interdigitated with front ends of said first belts when said first and second conveyors are fully extended;

a plurality of vertically extending positioning pins disposed at a boundary between said first conveyor and said second conveyor in such a manner as to be capable of being raised and lowered to project upwardly between the fully extended first and second conveyor for fixing a position of the belt-shaped members relative to each other;

upper joining pawls disposed above said positioning pins in such a manner as to be capable of being raised and lowered; and lower joining pawls disposed below said upper joining pawls in such a manner as to be capable of being raised and lowered, wherein when the first and second conveyors are retracted, the first and second belts remain in the position fixed by the positioning means, and the upper pawls are lowered and the lower pawls are raised so that the upper and lower pawls are engaged to join a front end of the belt-shaped member on said first conveyor with a rear end of the belt-shaped member on said second conveyor.

7. An apparatus for joining the ends of belt-shaped members according to claim 6, wherein said first and second belts are respectively trained around a plurality of idle rollers supported rotatably on a fixed frame such that a direction of travel of said first and second belts is reversible.

8. An apparatus for joining the ends of belt-shaped members according to claim 6, wherein a single driving means is coupled to said first and second conveyors, said positioning pins, and said upper and lower joining pawls, and wherein the extension and retraction of said first and second conveyors, the raising and lowering of said positioning pins, and the raising and lowering of said upper and lower joining pawls are effected by a driving force from said single driving means.

9. An apparatus for joining the ends of belt-shaped members according to claim 6, further comprising:

vertically extending guide rods mounted on a fixed frame;

a lifting base supported liftably and horizontally by said guide rods;

a first vertical rack secured to a side wall of said lifting base;

a second vertical rack fixedly secured to the fixed frame; and a pinion meshing with said first and second racks, lower ends of said vertically extending positioning pins being secured to an upper surface of said lifting base, wherein as said pinion is raised while rotating, said first rack and said lifting base are raised at high speed while being guided by said guide rack, and wherein when said lifting base reaches its upper limit, said positioning pins project upwardly between the fully extended first and second conveyors to fix the position of the belt-shaped members relative to each other.

10. An apparatus for joining the ends of belt-shaped members according to claim 6, wherein said first and second conveyors each comprise:

a moving table disposed movably along the longitudinal direction of the belt-shaped members while being guided by a guide;

a plurality of rollers supported at both ends of said moving table, each of said plurality of rollers rotating about a straight line parallel with the transverse direction of the belt-shaped members; and a plurality of idle rollers supported rotatably on a fixed frame, said first and second belts running on said rollers and said idle rollers.

11. An apparatus for joining the ends of belt-shaped members according to claim 10, wherein an end of said first conveyor and an end of said second conveyor are extended and retracted moving the moving tables in the longitudinal direction of the belt-shaped members without causing said first and second belts to travel as said moving tables move.

* * * * *